United States Patent Office 2,694,687
Patented Nov. 16, 1954

2,694,687

VINYLOXYALKYLMELAMINES

Peter L. de Benneville and Sidney Melamed, Philadelphia, Pa., assignors to Rohm & Haas Company, Philadelphia, Pa., a corporation of Delaware No Drawing. Application April 10, 1953,
Serial No. 348,104

12 Claims. (Cl. 260—2.1)

This invention relates to vinyloxyalkylmelamines, to polymers thereof, and to copolymers based thereon. It also deals with methods for preparing these products.

The vinyloxyalkylmelamines of this invention have the structure $$\begin{array}{c} R' \quad R'' \\ \diagdown \diagup \\ R-N-C-Z-O-CH=CH_2 \\ | \\ C \\ \diagup \diagdown \\ N \quad N \\ | \quad \| \\ H_2N-C \diagdown \diagup C-NH_2 \\ N \end{array}$$

wherein Z is an alkylene group of not over four carbon atoms, R is hydrogen or a hydrocarbon group containing up to 18 carbon atoms and having hydrogen on the carbon atom thereof attached to nitrogen, R' and R" are hydrogen or alkyl groups, preferably of not over four carbon atoms, with the proviso that when R is hydrogen, R' and R" are hydrocarbon, and when R' or R" is hydrogen, R is hydrocarbon. In preferred subclasses of compounds R' and R" are methyl groups or Z is methylene. Reasons for the restrictions with respect to the various R groups are based primarily on discoveries that compounds of this type can be made and isolated only when defined conditions are met.

The above compounds form interesting polymers and copolymers, which contain reactive groups and which may, therefore, be further reacted. The polymers and copolymers find use also in coating compositions, casting compositions, and the like. The monomers may be mixed with urea or melamine and the mixture then reacted with formaldehyde to form interesting resins for use in textile finishing, as adhesives, in coatings, and the like.

Vinyloxyalkylmelamines are formed by reacting together dicyandiamide and vinyloxyalkylcyanamides of the formula $$\begin{array}{c} R' \\ | \\ R-N-C-Z-O-CH=CH_2 \\ | \quad | \\ CN \quad R'' \end{array}$$

in the presence of a basic catalyst. While the actual reaction involves one mole of dicyandiamide and one mole of vinyloxyalkylcyanamide, such exact proportions in the reaction mixture are not essential, an excess of either being permissible.

Suitable catalysts include alkali metal hydroxides, potassium alcoholates, sodium alcoholates, and low molecular quaternary ammonium hydroxides. Typical of these are potassium hydroxide, potassium ethoxide, potassium butoxide, sodium methoxide, sodium ethoxide, sodium butoxide, choline, trimethylbenzylammonium hydroxide, dimethyldibenzylammonium hydroxide, trimethylbenzylammonium methoxide or butoxide, dimethyldibenzylammonium butoxide, etc. The amount of catalyst may vary from about 2% to 20% of the weight of reactants.

The reaction is best performed in an inert organic solvent. For this purpose the alcohols are highly useful, methanol, ethanol, propanol, isopropanol, butanol, methoxyethanol, ethoxyethanol, or mixtures of alcohols being conveniently taken for this purpose.

The reaction is usually carried out at temperatures between 50° and 125° C., effectively by heating the solvent solution under reflux. The reaction mixture is then suitably worked up. In many cases the product can be crystallized from the reaction medium or precipitated therefrom. In some cases the product is obtained as a residue after evaporation of solvent. The product is washed free of catalyst and desirably purified, as by recrystallizing, charcoaling, extracting, etc.

The cyanamides used in the above reaction are obtained by reacting a cyanogen halide and an aminoalkyl vinyl ether, as described in application Serial No. 348,110, filed on even date. As there described, a vinyl ether of the formula $$\begin{array}{c} R \quad R' \\ \diagdown \quad | \\ N-C-Z-O-CH=CH_2 \\ \diagup \quad | \\ R° \quad R'' \end{array}$$

is reacted with cyanogen chloride or bromide. For successful accomplishment of this reaction there are limitations with respect to substituent groups and additional limitations with respect to those cyanamides which can undergo the reaction to form vinyloxyalkylmelamines. In the above formula Z is an alkylene group, R' and R" may be hydrogen or alkyl, R and R° are hydrogen or hydrocarbon groups with the proviso that if both are hydrocarbon one of these is benzyl or lower alkyl.

If R and/or R° is hydrogen, reaction with cyanogen chloride or bromide is conducted in the presence of a basic substance for taking up hydrogen halide which is formed in the reaction. This substance is best an inorganic base such as sodium bicarbonate, sodium carbonate, potassium carbonate, sodium hydroxide, lime, or the like. This reaction is best performed in the presence of an inert organic solvent such as a chlorinated solvent, naphtha, benzene, toluene, or the like, and/or water. Temperatures between 0° and 75° C. are used. The product can usually be purified by distillation.

When both R and R° are hydrocarbon groups, the cyanogen halide is added to the aminoalkyl vinyl ether and the reaction mixture is then heated to split out an alkyl or aralkyl halide. Temperatures of 50° to 125° C. are used at this stage. For this reason when a tertiary amine group is present, one N-substituent should be methyl, ethyl, propyl, butyl, or benzyl. The other may be any hydrocarbon group, although it is preferred that this substituent have not over 12 carbon atoms and in one preferred form be alkyl.

Typical cyanamides are $NC \cdot NHC(CH_3)_2CH_2OCH=CH_2$ $CH_3N(CN)CH_2CH_2OCH=CH_2$ $CH_3N(CN)CH_2CH_2CH_2OCH=CH_2$ $NC \cdot NHC(CH_3)_2(CH_2)_3OCH=CH$ $CH_3N(CN)CH_2CH(CH_3)OCH=CH_2$ $CH_3N(CN)CH(CH_3)CH_2OCH=CH_2$ $C_4H_9N(CN)CH(CH_3)CH_2OCH=CH_2$ $C_3H_5(allyl)N(CN)CH_2CH_2OCH=CH_2$ $C_6H_5CH_2N(CN)CH_2CH_2OCH=CH_2$ $C_6H_{11}N(CN)CH_2CH_2OCH=CH_2$ $C_8H_{17}N(CN)CH_2CH(CH_3)OCH=CH_2$ $CH_3N(CN)CH_2CH(C_6H_5)OCH=CH_2$ $CH_3N(CN)C(CH_3)(C_6H_5)CH_2CH_2OCH=CH_2$ $NC \cdot N(CH_3)CH_2CH_2OCH_2CH_2OCH=CH_2$ $NC \cdot N(C_6H_5CH_2)CH_2CH_2SCH_2CH_2OCH=CH_2$ $CH_3N(CN)CH_2CH(C_6H_{13})OCH=CH_2$ $CH_3N(CN)(CH_2)_5OCH=CH_2$ $CH_3N(CN)(CH_2)_4OCH=CH_2$, etc.

The following examples are given to illustrate typical methods of preparing the necessary cyanamides from which the vinyloxyalkylmelamines are prepared.

Example A

In a reaction vessel surrounded by an ice bath there are mixed 40.4 parts of N-methylaminoethyl vinyl ether, 27.6 parts of anhydrous potassium carbonate, 135 parts of benzene, and 20 parts of water, all parts being by weight. Into this mixture while it is stirred and held at a low temperature, 24.6 parts of cyanogen chloride are passed over a 30 minute period. The mixture is then allowed to warm up to about 25° C. and is stirred for an hour at about this temperature. Sodium chloride in an amount of about 10 parts is added to reduce the solubility of the cyanamide which has been formed. Aqueous and benzene layers form and are separated. The benzene layer is freed of benzene by heating and the residue is fractionally distilled. At 137°–139° C./32 mm. a fraction is obtained which consists of N-methyl-N-vinyloxyethylcyanamide,

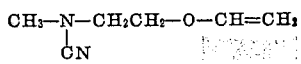

The same procedure may be followed for preparing other N-substituted compounds, such as N-ethyl-, N-butyl-, N-cyclohexyl-, N-benzyl-, N-allyl-, N-octyl-, or N-dodecyl-.

Example B

To 11.5 parts of β-dimethylaminoethyl vinyl ether in a reaction vessel equipped with stirrer and condenser chilled with ice water there is slowly added cyanogen chloride as a gas in an amount of 6.4 parts. Heat is evolved and the temperature of the reaction mixture is controlled with external cooling. When the exothermic reaction has subsided, the reaction mixture is heated on a steam bath for an hour. It is cooled to about 30° C. and extracted with ether. The ether extract is filtered and distilled to yield four parts of N-methyl-N-vinyloxyethylcyanamide, coming over at 120°–140° C./26 mm.

Example C

To a mixture of 104 parts of 2-methyl-2-aminopropyl vinyl ether, 280 parts of benzene, 49 parts of water, and 65 parts of anhydrous potassium carbonate there is added over a one hour period 57.5 parts of cyanogen chloride at 10°–20° C. The mixture is stirred for two hours at 25°–30° C. The benzene layer is taken and distilled. At 104°–107° C./1.5 mm. there is obtained as a clear, light yellow oil the product, N-α,α-dimethyl-β-vinyloxyethylcyanamide.

The same procedure may be applied to the preparation of N-ethyl-, N-butyl-, N-octyl-, N-cyclohexyl-, etc., derivatives.

Example D

To a solution of 46 parts of 1-methylamino-2-vinyloxypropane, 40 parts of toluene, 30 parts of potassium carbonate, and 50 parts of water there was slowly added a solution of 24 parts of cyanogen chloride in 86 parts of toluene. The temperature of the reacting mixture was held at 5°–8° C. with the aid of an ice bath. The mixture was stirred for two hours with the temperature rising to 25° C. Layers were then allowed to form. The organic layer was taken and distilled. After removal of toluene a fraction of 50 parts was obtained distilling at 86°–93° C./0.8 mm. It contained by analysis 19.8% of nitrogen. This product is N-methyl-N-2-vinyloxypropyl-cyanamide, for which the theoretical nitrogen content is 20.0%. This compound has the formula

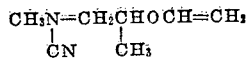

The N-vinyloxyethylcyanamides are reacted with dicyandiamide as stated above. Typical reactions of these materials are described in the following illustrative examples.

Polymerization is also illustrated. For this purpose the vinyloxyalkylmelamines are heated to 50° to 90° C. with a free radical catalyst, particularly of the azo type. Useful catalysts include dimethyl or diethyl azodiisobutyrate, azodiisobutyronitrile, azobis(α,γ-dimethylvaleronitrile), azobis(α-methylbutyronitrile), dimethyl or diethyl azobismethylvalerate, or the like. The amount of catalyst is usually about 0.1% to 2% by weight of of the monomer.

Example 1

(a) There were mixed 12.6 parts of N-methyl-N-vinyloxyethylcyanamide, 10 parts of dicyandiamide, and a solution of two parts of potassium hydroxide in 50 parts of isopropanol. This mixture was heated under reflux for six hours and left standing for 16 hours. It was chilled to 0° C. and filtered. The filter cake was washed with 50 parts of water at 65° C. The washed material was dried. It melted at 136°–139° C. and amounted to 14.5 parts. It was recrystallized from isopropanol and then melted at 137.5°–139° C. This product contained by analysis 39.5% of nitrogen and was N-methyl-N-vinyloxyethylmelamine. The theoretical nitrogen content is 40%.

This material is fungitoxic. A 1% solution of this compound in water gives 100% control of *Sclerotinium fructicola*.

(b) A solution was prepared from 21.5 parts of N-methyl-N-vinyloxyethylmelamine and 21.5 parts of dimethylformamide in a pressure vessel. The air in the vessel was displaced with nitrogen and 0.32 part of dimethyl azodiisobutyrate was added. The vessel was tightly closed and heated at 75° C. for 16 hours. The polymer which was formed was precipitated upon addition of acetone. The precipitate was washed with hot acetone and hot isopropanol ot remove monomer. The washed product was dried. It amounted to 20 parts, a yield of 93% of white polymer, poly-N-methyl-N-vinyloxyethylmelamine.

There were mixed 2.1 parts of this polymer, 8.32 parts of aqueous 37% formaldehyde solution, and 10 parts of water. The mixture was treated with 0.03 part of aqueous 5% sodium carbonate solution. This mixture was heated for 10 minutes at 80° to 90° C., a clear solution resulting. This solution was heated for 20 minutes at 60° C. and cooled. It was treated with 61 parts of 0.092 N hydrochloric acid solution and diluted with water to 100 parts. This was a 3.5% solution of the hydroxymethyl derivative of the polymer of N-methyl-N-vinyloxyethylmelamine. It was found excellent as an agent for imparting wet strength to paper.

Example 2

There were mixed 28 parts of N-α,α-dimethyl-β-vinyloxyethylcyanamide, 20 parts of dicyandiamide, and 17 parts of isopropanol. The mixture was heated to refluxing temperatures and treated with four parts of potassium hydroxide in 34 parts of isopropanol. This reaction mixture was heated under reflux for six hours. It was filtered hot. The filtrate was allowed to cool. A solid formed. It was washed at 45° C. with 100 parts of water. The washed solid was recrystallized from benzene to give a colorless product melting at 96°–98° C. and containing by analysis 37.3% of nitrogen. This product was N-α,α-dimethyl-β-vinyloxyethylmelamine.

This compound forms polymers when treated with an azo free radical catalyst. The polymers are soluble in mineral acids and in organic acids, but are insoluble in water. They are useful as sizing agents.

Example 3

(a) A mixture of 46 parts of 1-methylamino-2-vinyloxypropane, 40 parts of toluene, 30 parts of potassium carbonate, and 50 parts of water is treated at 5°–8° C. with 24 parts of cyanogen chloride in 86 parts of toluene. The organic layer from this reaction mixture is distilled to give N-methyl-N-2-vinyloxypropylcyanamide, coming over at 86°–93° C./0.8 mm.

(b) There are mixed 43 parts of this compound and 31 parts of dicyandiamide. Thereto is added a solution of six parts of potassium hydroxide in 150 parts of isopropanol. The resulting mixture is heated for six hours under reflux. The mixture is allowed to cool to 30° C. and filtered. The filtrate is stored at 0° C. and a colorless solid precipitates therein. After two recrystallizations from toluene the solid melts at 95°–97° C. It corresponds in composition to N-methyl-N-2-vinyloxypropylmelamine.

(c) A portion of this compound is treated with about one half per cent of its weight of dimethyl azodiisobutyrate and heated at 75° C. under nitrogen in dimethylformamide. A polymer forms.

Example 4

(a) In a similar way β-3,5,5-trimethylhexylaminoethyl vinyl ether and cyanogen chloride are reacted to form the corresponding cyanamide, distilling at 128°–132° C./0.5 mm.

(b) As in the previous examples, 38 parts of N-3,5,5-trimethylhexyl-N-2-vinyloxyethylcyanamide are mixed with 16 parts of dicyandiamide and 3.2 parts of potassium hydroxide in 65 parts of isopropanol. This mixture is heated under reflux for eight hours. The reaction mixture is filtered to remove insoluble material. The filtrate is washed with about 300 parts of water several times. The oil which is thus obtained slowly solidifies and is dried at 50°–60° C. under reduced pressure. There is thus obtained a waxy solid which melts at 72°–78° C. and corresponds in composition to N-3,5,5-trimethylhexyl-N-2-vinyloxyethylmelamine.

This compound forms a polymer when heated in solution or dispersion with an azo catalyst.

Example 5

By generally similar procedures there is prepared N-cyclohexyl-N-2-vinyloxyethylcyanamide and this is reacted with dicyandiamide. A mixture of 86 parts of N-cyclohexyl-N-2-vinyloxyethylcyanamide, 41 parts of dicyandiamide, 8.7 parts of potassium hydroxide, and 170 parts of isopropanol is heated under reflux for 16 hours and filtered to remove insoluble materials. The filtrate is chilled. Crystals form and are collected, washed with isopropanol, and dried to yield 51 parts of a colorless powder melting at 144°–146° C. and corresponding in composition to N-cyclohexyl-N-2-vinyloxyethylmelamine.

Example 6

There is prepared from β-2-ethylhexylaminoethyl vinyl ether and cyanogen chloride the corresponding cyanamide, distilling at 111°–114° C./0.3 mm. A mixture is prepared from 110 parts of N-2-ethylhexyl-N-2-vinyloxyethylcyanamide, 46 parts of dicyandiamide, 9.7 parts of potassium hydroxide, and 160 parts of isopropanol. The mixture is heated under reflux for 16 hours. The insoluble material is filtered off and the filtrate is poured into 2000 parts of water. Toluene is added thereto to take up the product. The toluene layer is distilled to remove the solvent and leave a residue, which solidifies. It corresponds in composition to N-2-ethylhexyl-N-2-vinyloxyethylmelamine.

Polymers of these materials can be converted to alkoxymethyl derivatives which form hard, glossy, solvent-resistant films on acid-catalyzed baking at 150° C. for 30 minutes.

Polymers formed from compounds such as shown in Examples 4, 5, and 6 are soluble in such organic solvents as methanol, isopropanol, or butanol. They may be taken up in solutions of formaldehyde in such alcohols. These solutions are adjusted with a basic material to a pH of 8.5 to 10 and heated between 50° and 80° C. The methylol derivatives result. On careful acidification of these solutions in stages, preferably with such an acid as formic or phosphoric which are soluble in these solutions, to pH's of 5 to 6 and then to 3 to 4, and heating, the methylol compounds are converted to alkoxymethyl derivatives. The catalyst is then neutralized. Solvent may be removed, if desired.

The alkoxymethyl compounds are soluble in common lacquer and coating solvents. They may be mixed with other alkoxymethyl nitrogenous condensates such as butoxymethyl derivatives of urea-formaldehyde or melamine-formaldehyde condensates. By themselves or in such admixture they may be incorporated with alkyd resins. When these various compositions are acid-catalyzed, filmed, and baked at 125°–180° C. for 10 to 30 minutes, hard, glossy, solvent-resistant coatings are obtained.

Example 7

A mixture is made from five parts of N-methyl-N-2-vinyloxypropylmelamine, five parts of dimethylformamide, and 0.15 part of dimethyl azodiisobutyrate. The mixture is heated at 75° C. for 16 hours under nitrogen. A clear, viscous solution results. It is poured into hot acetone. A white solid results. It is filtered off, washed with acetone, and dried. The monomer is soluble in acetone, isopropanol, methanol, and dimethylformamide. The polymer is insoluble in water, acetone, and alcohols, but soluble in dimethylformamide, mixtures of dimethylformamide with water or alcohols, in dilute inorganic acids, and in acetic acid. The polymer is also soluble in aqueous 36% formaldehyde solution.

Example 8

A mixture is prepared from five parts of N-methyl-2-(vinyloxypropyl)melamine, five parts of dimethylformamide, and 0.08 part of dimethyl azodiisobutyrate. This mixture is heated at 75° C. for 16 hours under nitrogen. After precipitation, as above, with acetone there is obtained 3.7 parts of white, solid polymer. It is insoluble in methanol, ethanol, and water, but is soluble in dilute hydrochloric acid.

Copolymers are formed from the vinyloxyalkylmelamines and one or more monovinylidene compounds which are polymerizable with free radical catalysts. Copolymers may be prepared in aqueous solution in cases where the monomers and copolymers are water-soluble. When they are solvent-soluble, they may be prepared in organic solvents. Also, dispersions of copolymers may be prepared through emulsion polymerization. In some instances suspension polymerization may be used. The copolymers find use in the fields of adhesives, coatings, textile finishes, etc.

Examples of polymerizable vinylidene compounds which have been found of interest include esters of acrylic acid, such as methyl acrylate, ethyl acrylate, butyl acrylate, 2-ethylhexyl acrylate, 3,5,5-trimethylhexyl acrylate, dodecyl acrylate, ethoxyethyl acrylate, butoxyethyl acrylate, phenoxyethyl acrylate, cyclohexyl acrylate, benzyl acrylate, and the like, acrylamides, acrylonitrile, methacrylonitrile, esters of methacrylic acid including methyl, ethyl, propyl, butyl, hexyl, octyl, dodecyl, cetyl, ethoxyethyl, butoxyethyl, cyclohexyl, benzyl, and dimethylaminoethyl methacrylates, vinyl esters such as vinyl acetate, ureidoethyl vinyl ether, vinylpyridine.

In some cases the vinyloxyalkylmelamines serve to vary the properties of the polymeric products or to supply new properties. Here from 1% to 50% of the monomer mixture will consist of one or more vinyloxyalkylmelamines. When more than 50% of the mixture comprises a vinyloxyalkylmelamine, the resulting copolymers can be primarily regarded as modified polyvinyloxyalkylmelamines. Yet this is not always correct, because often some new and unexpected properties are developed in the copolymers. Many of the copolymers, particularly when they contain a major portion of an acrylate, methacrylate, or vinyl ester can be prepared with peroxide free-radial catalysts. Numerous examples of these are in the art.

Typical preparations of copolymers which follow supply further details of satisfactory procedures and show how worthwhile properties can be developed.

Example 9

There were mixed 15 parts of N-methyl-N-vinyloxyethylmelamine, 85 parts of ureidoethyl vinyl ether, 100 parts of water, and one part of dimethyl azodiisobutyrate. The reaction vessel was flushed with nitrogen and heated at 75° C. for 20 hours. A viscous solution resulted. This aqueous solution was poured into acetone to give a white precipitate. This was washed with acetone and dried. The yield was about 90% of copolymer. This was soluble in water and in formaldehyde solution. It reacted with formaldehyde to form a methylol derivative.

This was used in the preparation of paper with a bleached sulfite pulp at 1% on the weight of the dry pulp. The pulp was adjusted to a pH of four with 3% alum and formed into sheets, which were heat dried. At seven days the tensile strength of the dry sheets was 25 pounds per inch, while the wet strength was 10 pounds per inch. Comparable data for paper made with the same weight of the methylol derivative of polyureidoethyl vinyl ether were 21 pounds per inch and 3 pounds per inch, which has heretofore been regarded as good for this type of pulp.

Example 10

There are mixed 147 parts of N-methyl-N-vinyloxyethyl-melamine and 1606 parts of ethoxyethyl acetate and the mixture is heated to 75° C. under nitrogen. A solution is made from 17.5 parts of azodiisobutyronitrile in 200 parts of ethoxyethyl acetate. Half of this is added to the heated mixture and the other half is added to 1330 parts of methyl methacrylate, which is then added to the heated mixture over a period of two hours, while the temperature of the mixture is kept between 75° and 80° C. A solution of one part of azodiisobutyronitrile in 200 parts of ethoxyethyl acetate is added to the mixture at this time. Heating is continued for three hours. During this time another addition of the last composition is made. The viscosity then is Z–2 on the Gardner-Holdt scale. After this solution is treated with a butanol-formaldehyde solution, an acid catalyst, and additional solvent, films are formed. These are baked at 150° C. for 30 minutes to give hard, glossy, solvent-resistant coatings.

The methyl methacrylate may be replaced with vinyl acetate or acrylonitrile or a mixture of methyl methacrylate and ethyl acrylate. In each case a solution of a copolymer results. Any of these is useful in coating compositions.

Example 11

There are mixed 95 parts of ethyl acrylate, 5 parts of N-methyl-N-vinyloxyethlmelamine, 290 parts of water, and 6 parts of a surface active octylphenoxypolyethoxyethanol. The mixture is cooled to about 15° C. and treated with 0.12 part of ammonium persulfate and 0.16 part of diethylenetriamine. The mixture is stirred. The temperature soon rises while copolymerization proceeds. There results a dispersion of copolymer. This is particularly useful in the finishing of fabrics.

Example 12

In the same way an emulsion of 90 parts of butyl acrylate and 10 parts of N-nonyl-N-vinyloxyethylmelamine is polymerized to give an aqueous dispersion of copolymer. Likewise 92.5 parts of butoxyethyl acrylate and 7.5 parts of N-cyclohexyl-N-vinyloxyethylmelamine are copolymerized by the same procedure. Again, there are used 50 parts of ethyl acrylate, 40 parts of methyl methacrylate, and 10 parts of N-methyl-N-vinyloxyethylmelamine or N-butyl-N-2-vinyloxypropylmelamine to give a dispersion of copolymer. These dispersions are useful not only in textile finishing but also in the manufacture of paper.

The copolymers may also be converted to methylol derivatives by reaction wtih formaldehyde. Alkoxymethyl compounds may be made therefrom. These types of products find use as antistatic agents, stiffeners, and stabilizers, when the substituent groups are small. With large R groups in the part of the copolymers from a vinyloxyalkylmelamine or large hydrocarbon groups in the other comonomer or comonomers, water repellant effects are obtained.

Example 13

A mixture of 90 parts of N-methyl-N-vinyloxyethylmelamine and 10 parts of bisvinyloxyethylurea is dissolved in 100 parts of dimethylformamide. The resulting solution is treated with one part of diethyl azodiisobutyrate and is heated to 75°–80° C. under a nitrogen atmosphere for 16 hours. A gel forms. It develops into a hard insoluble product which has a high capacity for absorbing acids and serves as an anion-exchange resin.

Vinyloxyalkylmelamines of this invention are characterized by their capacity for forming polymers and copolymers of high molecular weight. This is in contrast to polymers formed, for example, from compounds in which a vinylidene group is polymerizable with free radical catalysts is attached to a methylene or a methynyl group. The polymers and copolymers contain active groups for reaction with other substances, such as cellulose, wool, or formaldehyde. Cross-linking can be attained through this feature.

Melamine substituted vinyl ethers in contrast to alkyl vinyl ethers surprisingly form high polymers with free-radical catalysts. These vinyl ethers cannot be polymerized with acid catalysts as can typical alkyl vinyl ethers.

We claim:

1. A compound of the formula

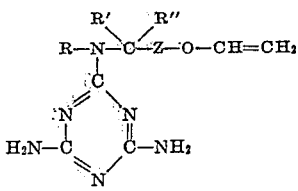

wherein Z is an alkylene group of not over four carbon atoms, R is a member of the class consisting of hydrogen and hydrocarbon groups which contain not over 18 carbon atoms and which have hydrogen on the carbon atom attached to nitrogen, R' and R" are alkyl groups of not over four carbon atoms when R is hydrogen and when R is hydrocarbon, R' and R" are members of the class consisting of hydrogen and alkyl groups of not over four carbon atoms.

2. A polymer of a compound of claim 1.

3. A compound of the formula

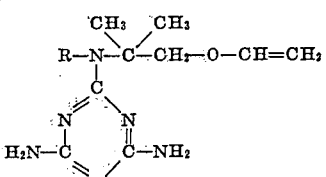

wherein R is an alkyl group of not over 12 carbon atoms.

4. A polymer of a compound of claim 3.

5. A compound of the formula

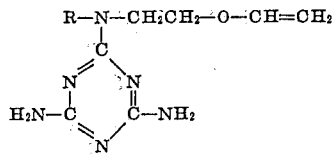

wherein R is an alkyl group of not over 12 carbon atoms.

6. A polymer of a compound of claim 5.

7. The compound of the formula

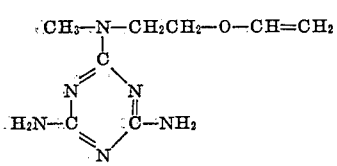

8. The compound of the formula

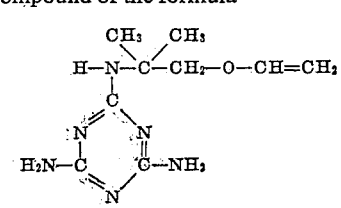

9. The compound of the formula

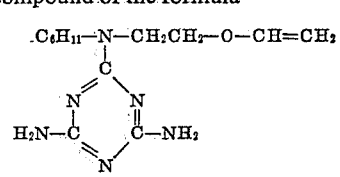

where $C_6H_{11}$ is the cyclohexyl group.

10. A compound of the formula

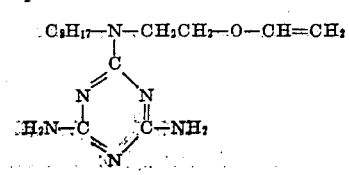

11. A copolymer of a compound of the formula

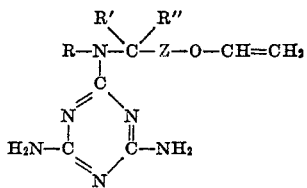

and another vinylidene compound which is polymerizable with free radical catalysts, in the above formula Z being an alkylene group of not over four carbon atoms, R being a member of the class consisting of hydrogen and hydrocarbon groups which contain not over 18 carbon atoms and which have hydrogen on the carbon atom attached to nitrogen, R' and R" being alkyl groups of not over four carbon atoms when R is hydrogen and when R is hydrocarbon, R' and R" being members of the class consisting of hydrogen and alkyl groups of not over four carbon atoms.

12. A copolymer according to claim 11 wherein said vinylidene compound is a monovinylidene compound.

References Cited in the file of this patent

Cyanamid New Product Bulletin No. 26, March 1951, 12 pages, pages 6–12 of interest, abstract in 260—67.bc and 260–88.3.